Nov. 21, 1950 W. C. MOORE 2,531,288
EXTENSION DRAIN
Filed Sept. 5, 1946 2 Sheets-Sheet 1

INVENTOR.
Willard C. Moore
BY Henry G. Dylvig
His Attorney

Nov. 21, 1950 W. C. MOORE 2,531,288
EXTENSION DRAIN
Filed Sept. 5, 1946 2 Sheets-Sheet 2
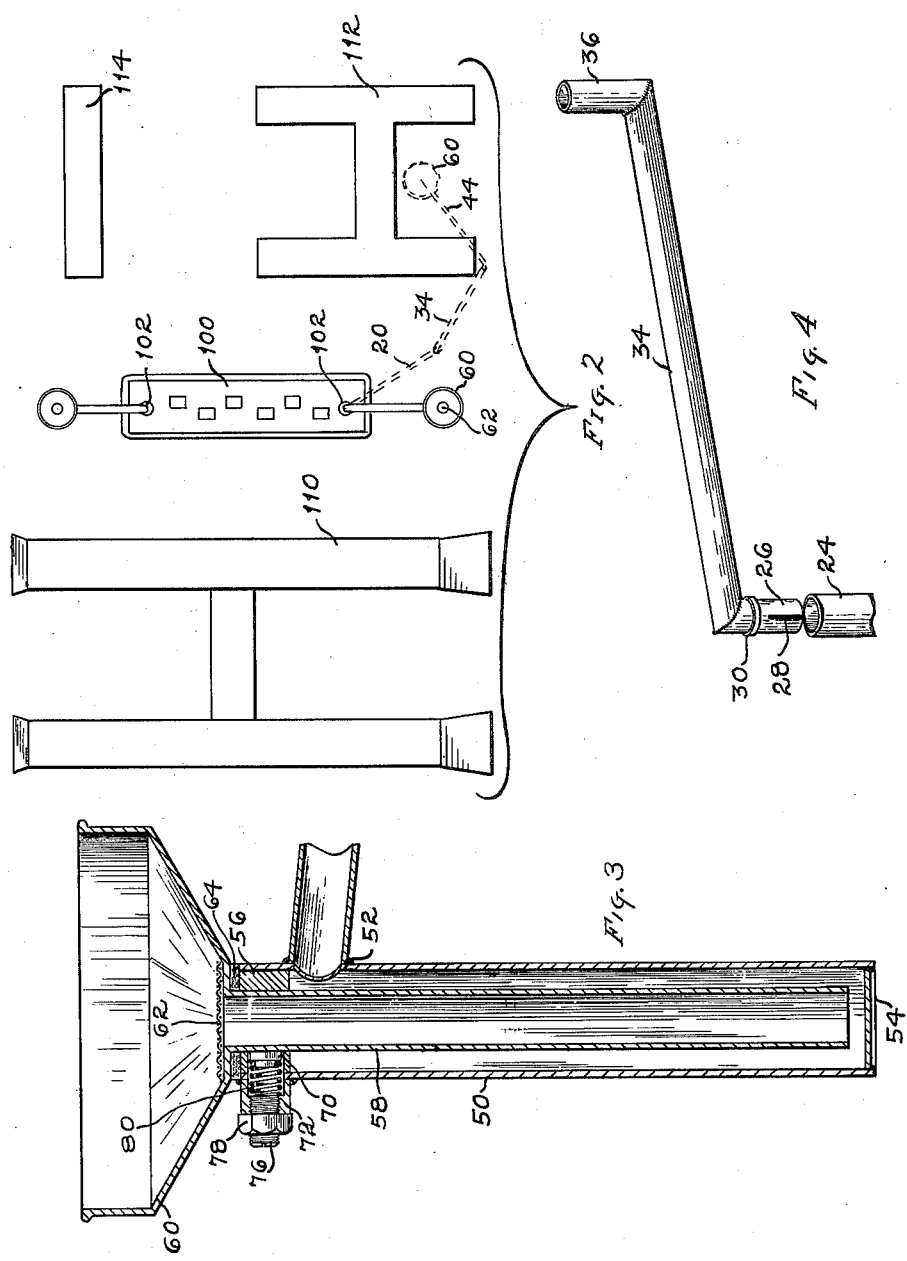
INVENTOR.
Willard C. Moore
BY Henry G. Dybvig
His Attorney Patented Nov. 21, 1950

2,531,288

UNITED STATES PATENT OFFICE 2,531,288

EXTENSION DRAIN

Willard C. Moore, Dayton, Ohio

Application September 5, 1946, Serial No. 694,937

4 Claims. (Cl. 184—1.5)

This invention relates to an extension drain and more particularly to an extension drain adaptable for use in service stations and the like, although not necessarily so limited.

In the past, in the manufacture of oil drains, it has been common practice to use common black iron gas pipe. The ends of the several pipe lengths, usually three or four, may be connected through suitable elbows to swivel joints, there being a swivel joint on the opposite ends of each of the intermediate pipe lengths. In the first place, black iron pipes are heavy. In the second place, the swivel joints used in the past have been made heavier and heavier, so as to obtain the desired strength. This results in a heavy assembly. That being the case, the drain, upon being extended, sags. In order to overcome this sagging effect, it has been customary to make the parts heavier to give greater strength, thereby increasing the weight and as a result thereof, increasing the tendency to sag.

An object of this invention is to make an oil drain wherein the parts are made from light weight steel tubing, graduated in size, so that by welding nipples on the ends of each extension, these ends may be telescopically disposed, so as to provide a simple swivel joint, light in weight and at the same time strong and dependable.

Another object of this invention is to provide an expansible oil drain that is light in weight, that is easily constructed and at the same time dependable, efficient and long lasting.

A further object of this invention is to provide an expansible oil drain made from parts such that a great distance may be reached without the parts sagging to an extent where they become inoperative.

Other objects and advantages reside in the construction of parts, the combination thereof and the mode of operation, as will become more apparent from the following description.

Referring to the drawings,

Figure 2 is a schematic view of a pair of expansible oil drains mounted in a service cabinet and adapted to be expanded into oil draining position under either one of the lifts shown.

Figure 3 is a fragmentary cross sectional view taken substantially on the line 3—3 of Figure 1.

Figure 4 is an exploded view of one of the joints indicated by one of the arrows 4 in Figure 1.

Figure 1:
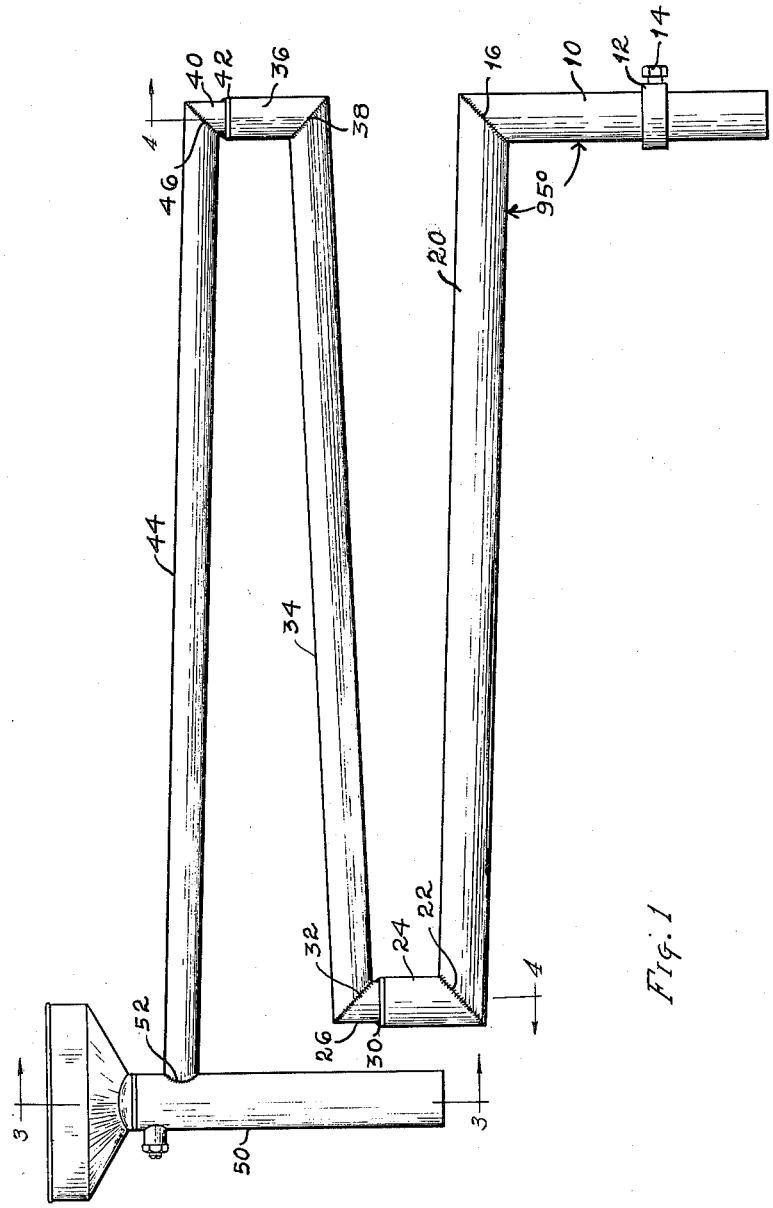
Figure 1 is a side elevational view of an expansible oil drain.

In the drawings, the reference character 10 indicates a steel pipe provided with an adjustable collar 12 held in position by a suitable set screw 14. The upper end 16 of the pipe 10 has been severed along an angle of 47.5° with respect to the longitudinal axis. This severed end is welded to a tubular pipe 20, also severed on an angle of 47.5°, so that 10 and 20 form a 95° angle. The opposite end of the pipe 20 is also severed on an angle of 47.5° with respect to the longitudinal axis of the pipe 20 and is welded at 22 to member 24, which in reality is merely a nipple severed on a like angle. The nipple 24 has telescopically mounted therein a nipple 26, provided with a pair of saw-cut slots or grooves 28, diametrically disposed in the portion that projects into the nipple 24, as best seen in Figure 4.

A collar 30 surrounds the nipple 26, so as to form a shoulder, limiting the telescopic movement of members 24 and 26. The diameter of the nipple 24, which is the same diameter of the pipes 10 and 12, has been so selected that the interior diameter is substantially the same as the outer diameter of the nipple 26. The saw-cut grooves 28 provide a resilient friction fit between members 24 and 26, so that these pipes remain in any adjusted position. The nipple 26 is provided with an angularly disposed joint or end, welded at 32 to the pipe 34, the pipe 34 forming an angle of 95° with the nipple 26.

The opposite end of the pipe 34 has welded thereto a nipple 36 at a joint 38. The pipe 34 and the nipple 36 again form an angle of 9.5°. The nipple 36 has mounted therein a nipple 40, held in position by a collar 42, welded to the nipple 40 and providing a shoulder for limiting the telescopic movement of the nipples 36 and 40. The collars 30 and 42 are welded to their respective nipples.

The nipple 40 is joined to a pipe 44 along the diagonal joint 46 in such a manner that the nipple 40 forms a 95° angle with the pipe 44. The end of the pipe 44 is welded to a vertically disposed pipe 50 along a welded joint 52. The pipe 50 is provided with a closed end 54 obtained by welding a circular disc of steel in position, so as to form an oil-tight bottom for the pipe 50. A ring 56, snugly fitting within the pipe 50, is held in position by welding. The ring 56 is provided with an opening for adjustably receiving a pipe 58, having its upper end attached to a funnel 60. The funnel 60 may be provided with a suitable screen 62, so as to function as a filter or strainer for the oil. A gasket member 64 is mounted on top of the ring 56 and on top of the upper end of the pipe 50 and is positioned between the funnel 60 and the pipe 50, so as to provide a cushion. The funnel 60, together with the pipe 58, may be adjusted vertically any suitable distance and held in adjusted position by a retaining or brake member 70 seated in an aperture in the side of the ring 56, registering with the aperture in the pipe 50.

A hollow tubular member 72 is welded to the pipe 50 and is provided with a cylindrical cavity registering with the opening in the pipe 50 and a side opening in the collar 56. The cylindrical cavity in member 72 has an outer reduced bore threadedly supporting a plug or a screw 76, held in position by a lock washer or nut 78. The screw 76 is provided with a kerf, so as to permit adjustment thereof and abuts a compression spring 80 positioned between the plug 76 and the retaining member 70, so as to frictionally engage the pipe 58 to hold it in any adjusted position.

Referring to Figure 2, a cabinet 100 has been shown. This is a cabinet that is used in connection with the service of automobiles and may be of any style or form that is already found at the service station or that may be purchased for use at the service station. Within this cabinet a pair of drain pipes connected to a suitable reservoir or drain projects upwardly underneath the openings 102.

The drain pipes have an inside diameter substantially the same as the outside diameter of the pipe 10, so that the pipe 10 may be inserted into the drain pipe within the cabinet. These drain pipes are rigidly positioned so as to provide a rigid support for the drain assembly described above. The collar 12 is adjusted so as to abut the top of the drain pipe and so as to hold the expansible pipe assembly at the proper height for the particular type of lift used.

When the drain pipes have been used, they are adjusted into the zig-zag relation shown in Figure 2. When the car, truck or other vehicle is driven upon the lift 110 or upon the lifts 112 and 114 operating in unison, one of the expansible pipe units used in draining the car, depending upon the end of the car that is to be drained, is adjusted to a position underneath the oil drain of the car. The funnel is then raised to the proper height so as to prevent splashing. The car is then drained, whether it be the transmission, the differential or the crank case. The oil flows through the extended pipes frictionally held in position.

When the car has been drained, the funnel is lowered into the position shown in Figure 3, the expansible pipes withdrawn from underneath the lift and adjusted into the position shown in Figure 2, in readiness for a succeeding operation.

Due to the fact that the pipes are welded together and are telescopically engaged at each end, and due to the fact that the pipes are made from light weight steel tubing, a drainage system has been provided wherein the oil readily flows into the oil drain under the cabinet without the pipes sagging.

By utilizing the welded joints, as described above, there are no obstructions or inwardly directed projections that interfere with the draining oil. Furthermore, if it is found necessary to disassemble the drain pipes, it is merely necessary to pull the telescopic members apart. It is not necessary to unscrew bolts holding the parts together, it is not necessary to unscrew unions or couplings. The only thing that is necessary is to lift the upper drain section from the lower drain section. Likewise, when assembling the parts, it is merely necessary to telescopically join the sections together and when one section has been inserted into the other, the job is completed, without the necessity of bolting the parts together or of coupling the parts together by threaded joints or unions.

By utilizing removable sections, it can readily be seen that the number of sections may be varied to meet various conditions. Furthermore, sections may be added or taken away to meet changed conditions. There may be installations where it is found necessary to change or move the lift to a point further removed, in which event one or more sections could be added to the drain to accommodate the change. Also, an installation may be made to accommodate passenger cars. Later trucks may be serviced, requiring a longer drain pipe. If so, it is merely necessary to add another section or sections to meet the new requirements, or exchange sections for longer or shorter sections, as the case may be.

Although the preferred embodiment of the device has been described, it will be understood that within the purview of this invention various changes may be made in the form, details, proportion and arrangement of parts, the combination thereof and the mode of operations, which generally stated consist in a device capable of carrying out the objects set forth, as disclosed and defined in the appended claims.

Having thus described my invention, I claim:

1. An extensible oil drain assembly adapted for use in draining the oil from a motor vehicle mounted on a lift or the like into a vertically disposed fixed drain pipe, said expansible drain assembly including a plurality of sections each having an inlet and an outlet, successive sections being reduced in diameter so that the inner diameter of one section is substantially equal to the outer diameter of a succeeding section, the outlet of one section being telescopically arranged with the inlet of the succeeding section, each of said sections including a tubular steel pipe forming a slight angle with respect to the horizontal, so as to provide a slope for the draining oil, each of said tubular steel pipes having the ends cut at an angle, vertically disposed nipples also cut at an angle welded to the tubular steel pipe, said nipples being made from tubular steel material and the lower nipple projecting downwardly being provided with a saw cut groove so as to provide a resilient end telescopically engaging a pipe into which the oil drains, and means on the downwardly projecting pipe for engaging the telescopically arranged pipe so as to limit the movement of the nipple into the lower pipe, said telescopic union forming swivel unions for joining the pipes so as to permit expansion thereof to extend the pipes into position for drainage.

2. An extensible oil drain assembly adapted for use in draining the oil from a motor vehicle mounted on a lift or the like into a vertically disposed fixed drain pipe, said expansible drain assembly including a plurality of sections each having an inlet and an outlet, successive sections being reduced in diameter so that the inner diameter of one section is substantially equal to the outer diameter of a succeeding section, the outlet of one section being telescopically arranged with the inlet of the succeeding section, each of said sections including a tubular steel pipe forming a slight angle with respect to the horizontal, so as to provide a slope for the draining oil, each of said tubular steel pipes having the ends cut at an angle, vertically disposed nipples also cut at an angle welded to the tubular steel pipe, said nipples being made from tubular steel material and the lower nipple projecting downwardly telescopically engaging a pipe into which the oil drains, and means on the downwardly projecting pipe for engaging the telescopically arranged pipe so as to limit the movement of the nipple into the lower pipe, said telescopic union forming swivel unions for joining the pipes so as to permit expansion thereof to extend the pipes into position for drainage.

3. An extensible oil drain assembly adapted for use in draining the oil from a motor vehicle mounted on a lift or the like into a vertically disposed fixed drain pipe, said expansible drain assembly including a plurality of sections each having an inlet and an outlet, successive sections being reduced in diameter so that the inner diameter of one section is substantially equal to the outer diameter of a succeeding section, the outlet of one section being telescopically arranged with the inlet of the succeeding section, each of said sections including a tubular steel pipe forming a slight angle with respect to the horizontal, so as to provide a slope for the draining oil, each of said tubular steel pipes having the ends cut at an angle, vertically disposed nipples also cut at an angle welded to the tubular steel pipe, said nipples being made from tubular steel material and the lower nipple projecting downwardly telescopically engaging a pipe into which the oil drains, and a collar fixedly attached to the downwardly projecting nipple to limit the telescopic movement of the nipple into the drain pipe.

4. An extensible oil drain assembly adapted for use in draining the oil from a motor vehicle mounted on a lift or the like into a drain pipe, said expansible drain assembly including a pair of sections, one on a higher level than the other, the upper section of which is of smaller diameter than the lower section, each of said sections including a substantially horizontally disposed drain pipe having a slight inclination from the horizontal to permit the oil to flow through the pipe, each of the pipes terminating in bevelled ends, and tubular nipples provided with bevelled ends welded to the bevelled ends of the pipes, one nipple on the upper pipe being directed downwardly and one nipple on the lower pipe being directly upwardly, the upwardly directed nipple having an inner diameter substantially equal to the outer diameter of the downwardly directed nipple, so that the sections are joined by merely telescoping the nipples and so that the sections may be separated by merely pulling the nipples apart and means to limit the distance the upper nipple telescopes into the lower nipple.

WILLARD C. MOORE.

REFERENCES CITED

The following references are of record in the file of this patent:

UNITED STATES PATENTS

| Number | Name | Date |
|---|---|---|
| 1,631,129 | Hiscox | June 7, 1927 |
| 1,651,616 | Morrison | Dec. 6, 1927 |

FOREIGN PATENTS

| Number | Country | Date |
|---|---|---|
| 404,941 | Germany | Oct. 27, 1924 |